United States Patent
Hanna et al.

(10) Patent No.: US 12,545,418 B2
(45) Date of Patent: Feb. 10, 2026

(54) CONTROL ASSEMBLY FOR AIRCRAFT PROPULSION SYSTEMS

(71) Applicant: Pratt & Whitney Canada Corp., Longueuil (CA)

(72) Inventors: Michael Hanna, Beaconsfield (CA); Jing Fang, Toronto (CA)

(73) Assignee: Pratt & Whitney Canada Corp., Longueuil (CA)

( * ) Notice: Subject to any disclaimer, the term of this patent is extended or adjusted under 35 U.S.C. 154(b) by 29 days.

(21) Appl. No.: 18/763,918

(22) Filed: Jul. 3, 2024

(65) Prior Publication Data

US 2026/0008556 A1  Jan. 8, 2026

(51) Int. Cl.
| | |
|---|---|
| *B64D 31/18* | (2024.01) |
| *B64D 27/33* | (2024.01) |
| *B64D 27/357* | (2024.01) |
| *B64D 31/04* | (2006.01) |
| *B64D 31/06* | (2006.01) |

(52) U.S. Cl.
CPC .............. *B64D 31/04* (2013.01); *B64D 27/33* (2024.01); *B64D 27/357* (2024.01); *B64D 31/06* (2013.01); *B64D 31/18* (2024.01); *F05D 2270/304* (2013.01); *F05D 2270/335* (2013.01)

(58) Field of Classification Search
CPC .... B64D 27/33; B64D 27/357; B64D 27/359; B64D 31/04; B64D 31/06; B64D 31/18; F23N 2241/20
See application file for complete search history.

(56) References Cited

U.S. PATENT DOCUMENTS

| | | | |
|---|---|---|---|
| 8,552,575 | B2 | 10/2013 | Teets |
| 10,787,271 | B2 | 9/2020 | Barth |
| 11,649,038 | B2 | 5/2023 | Mark |
| 11,760,495 | B2 | 9/2023 | Mark |
| 11,794,916 | B2 | 10/2023 | Mark |
| 11,852,084 | B2 | 12/2023 | Gomez |
| 11,884,412 | B2 | 1/2024 | Mark |
| 11,958,622 | B2 | 4/2024 | Poisson |
| 2016/0052626 | A1 | 2/2016 | Vander Mey |
| 2018/0339780 | A1 | 11/2018 | Barone |

(Continued)

OTHER PUBLICATIONS

EP Search Report for EP Patent Application No. 25187393.1 dated Sep. 10, 2025.

*Primary Examiner* — Scott J Walthour
(74) *Attorney, Agent, or Firm* — Getz Balich LLC

(57) ABSTRACT

An aircraft propulsion system assembly includes an aircraft propulsion system and a control assembly. The aircraft propulsion system includes a propulsor, an engine, and an electrical assembly. The engine is coupled to the propulsor. The electrical assembly includes an electric motor and a battery management system. The electric motor is coupled to the propulsor. The control assembly includes a plurality of channel A control units and at least one channel B control unit. The plurality of channel A control units includes an engine control unit for the engine and an electric motor control unit for the electric motor. The at least one channel B control unit is configured to identify valid and invalid output control signals of the engine control unit. The battery management system is configured to identify valid and invalid output control signals of the electric motor control unit.

20 Claims, 9 Drawing Sheets

(56) References Cited

U.S. PATENT DOCUMENTS

| | | |
|---|---|---|
| 2020/0180594 A1 | 6/2020 | Boecke |
| 2020/0277078 A1 | 9/2020 | Smith |
| 2021/0323425 A1 | 10/2021 | Minshull |
| 2021/0354837 A1* | 11/2021 | Mark .................. H02H 7/0833 |
| 2023/0261493 A1 | 8/2023 | Lacaux |

* cited by examiner

CONTROL ASSEMBLY FOR AIRCRAFT PROPULSION SYSTEMS

TECHNICAL FIELD

This disclosure relates to a control assembly for controlling an aircraft propulsion system propulsor.

BACKGROUND OF THE ART

Hybrid-electric propulsion system architectures for aircraft may typically include one or more engines (e.g., gas turbine engines) and one or more electric motors configured to facilitate aircraft propulsion. Various control assemblies for controlling operation of the engine(s) and electric motor(s) of a hybrid-electric propulsion system are known. While these known control assemblies may be suitable for their intended purposes, there is always room in the art for improvement.

SUMMARY

It should be understood that any or all of the features or embodiments described herein can be used or combined in any combination with each and every other feature or embodiment described herein unless expressly noted otherwise.

According to an aspect of the present disclosure, an aircraft propulsion system assembly includes a first aircraft propulsion system and a control assembly. The first aircraft propulsion system includes a first propulsor, a first engine, and a first electrical assembly. The first engine includes a first rotational assembly configured for rotation about a first engine rotational axis of the first engine. The first rotational assembly is coupled to the first propulsor. The first electrical assembly includes a first electric motor, a first battery, and a first battery management system. The first electric motor includes a first rotor. The first rotor is coupled to the first propulsor. The first battery is electrically connected to the first electric motor. The control assembly includes a first propulsion train sensor assembly for the first aircraft propulsion system, a plurality of channel A control units, and at least one channel B control unit. The first propulsion train sensor assembly includes a first engine sensor subassembly and a first electric motor sensor subassembly. The first engine sensor subassembly is configured to measure one or both of a first engine rotation speed and a first engine torque of the first rotational assembly. The first electric motor sensor subassembly is configured to measure one or both of a first electric motor rotation speed and a first electric motor torque of the rotor. The plurality of channel A control units includes a first engine control unit for the first engine and a first electric motor control unit for the first electric motor. The at least one channel B control unit is connected in signal communication with the first engine sensor subassembly and the first engine control unit. The at least one channel B control unit includes a first processor connected in signal communication with a first non-transitory memory including instructions which, when executed by the first processor, cause the first processor to identify valid and invalid output control signals of the first engine control unit using the one or both of the first engine rotation speed and the first engine torque. The first battery management system is connected in signal communication with the first electric motor sensor subassembly and the first electric motor control unit. The first battery management system includes a second processor connected in signal communication with a second non-transitory memory including instructions which, when executed by the second processor, cause the second processor to identify valid and invalid output control signals of the first electric motor control unit using the one or both of the first electric motor rotation speed and the first electric motor torque.

In any of the aspects or embodiments described above and herein, the first aircraft propulsion system may further include a gear box, and the gear box may couple the first rotational assembly and the first rotor to the first propulsor.

In any of the aspects or embodiments described above and herein, the at least one channel B control unit may be a single channel B control unit.

In any of the aspects or embodiments described above and herein, the first engine control unit and the first electric motor control unit may be connected in signal communication with the first propulsion train sensor assembly.

In any of the aspects or embodiments described above and herein, the aircraft propulsion system assembly may further include a second aircraft propulsion system including a second propulsor, a second engine, and a second electrical assembly. The second engine may include a second rotational assembly configured for rotation about a second engine rotational axis of the second engine. The second rotational assembly may be coupled to the second propulsor. The second electrical assembly may include a second electric motor. The second electric motor may include a second rotor. The second rotor may be coupled to the second propulsor. The control assembly may further include a second propulsion train sensor assembly for the second aircraft propulsion system. The second propulsion train sensor assembly may include a second engine sensor subassembly and a second electric motor sensor subassembly. The second engine sensor subassembly may be configured to measure one or both of a second engine rotation speed and a second engine torque of the second rotational assembly. The second electric motor sensor subassembly may be configured to measure a second electric motor rotation speed and a second electric motor torque of the rotor. The plurality of channel A control units may include a second engine control unit for the second engine and a second electric motor control unit for the second electric motor. The at least one channel B control unit may be connected in signal communication with the second engine sensor subassembly and the second engine control unit. The at least one channel B control unit may include a third processor connected in signal communication with a third non-transitory memory including instructions which, when executed by the third processor, cause the third processor to identify valid and invalid output control signals of the second engine control unit using the one or both of the second engine rotation speed and the second engine torque.

In any of the aspects or embodiments described above and herein, the first battery management system may be connected in signal communication with the second electric motor sensor subassembly and the second electric motor control unit. The instructions, when executed by the second processor, may further cause the second processor to identify valid and invalid output control signals of the second electric motor control unit using the one or both of the second electric motor rotation speed and the second electric motor torque.

In any of the aspects or embodiments described above and herein, the second electrical assembly may include a second battery and a second battery management system. The second battery may be electrically connected to the second electric motor. The second battery management system may be connected in signal communication with the second electric motor sensor subassembly and the second electric motor control unit. The second battery management system may include a fourth processor connected in signal communication with a fourth non-transitory memory including instructions which, when executed by the fourth processor, cause the fourth processor to identify valid and invalid output control signals of the second electric motor control unit using the one or both of the second electric motor rotation speed and the second electric motor torque.

In any of the aspects or embodiments described above and herein, the at least one channel B control unit may include a first channel B control unit and a second channel B control unit. The first channel B control unit may be connected in signal communication with the first engine control unit and the second channel B control unit may be connected in signal communication with the second engine control unit.

In any of the aspects or embodiments described above and herein, the first engine control unit and the first electric motor control unit may be connected in signal communication with the first propulsion train sensor assembly and the second engine control unit and the second electric motor control unit may be connected in signal communication with the second propulsion train sensor assembly.

In any of the aspects or embodiments described above and herein, the first electrical assembly and the second electrical assembly may be electrically interconnected.

According to another aspect of the present disclosure, an aircraft propulsion system assembly includes a cockpit control system, an aircraft propulsion system, and a control assembly. The aircraft propulsion system includes a propulsor, an engine, and an electrical assembly. The engine includes a rotational assembly configured for rotation about an engine rotational axis of the engine. The rotational assembly is coupled to the propulsor. The electrical assembly includes an electric motor, a battery, and a battery management system. The electric motor includes a rotor. The rotor is coupled to the propulsor. The control assembly includes a propulsion train sensor assembly, a plurality of channel A control units, and at least one channel B control unit. The propulsion train sensor assembly includes an engine sensor subassembly and an electric motor sensor subassembly. The engine sensor subassembly is configured to measure one or both of an engine rotation speed and an engine torque of the rotational assembly. The electric motor sensor subassembly is configured to measure one or both of an electric motor rotation speed and an electric motor torque of the rotor. The plurality of channel A control units includes an engine control unit for the engine and an electric motor control unit for the electric motor. The engine control unit is configured to generate an output engine control signal for operation of the engine based on an input engine command signal from the cockpit control system. The electric motor control unit is configured to generate an output electric motor control signal for operation of the electric motor based on an input electric motor command signal from the cockpit control system. The at least one channel B control unit includes a first processor connected in signal communication with a first non-transitory memory including instructions which, when executed by the first processor, cause the first processor to identify valid and invalid output control signals of the output engine control signal using the one or both of the engine rotation speed and the engine torque. The battery management system is connected in signal communication with the electric motor sensor subassembly and the electric motor control unit. The battery management system includes a second processor connected in signal communication with a second non-transitory memory including instructions which, when executed by the second processor, cause the second processor to identify valid and invalid output control signals of the output electric motor control signal using the one or both of the electric motor rotation speed and the electric motor torque.

In any of the aspects or embodiments described above and herein, the engine sensor subassembly may include at least one channel A sensor and at least one channel B sensor. Each of the at least one channel A sensor and the at least one channel B sensor may be configured to measure the one or both of the engine rotation speed and the engine torque. The at least one channel A sensor may be connected in signal communication with the cockpit control system. The at least one channel B sensor may be connected in signal communication with the at least one channel B control unit.

In any of the aspects or embodiments described above and herein, the instructions, when executed by the first processor, may further cause the first processor to identify the valid and invalid output control signals of the output engine control signal using the one or both of the engine rotation speed and the engine torque measured by the at least one channel B sensor.

In any of the aspects or embodiments described above and herein, the electric motor sensor subassembly may include at least one channel A sensor and at least one channel B sensor. Each of the at least one channel A sensor and the at least one channel B sensor may be configured to measure the one or both of the electric motor rotation speed and the electric motor torque. The at least one channel A sensor may be connected in signal communication with the cockpit control system. The at least one channel B sensor may be connected in signal communication with the battery management system.

In any of the aspects or embodiments described above and herein, the instructions, when executed by the second processor, may further cause the second processor to identify the valid and invalid output control signals of the output electric motor control signal using the one or both of the electric motor rotation speed and the electric motor torque measured by the at least one channel B sensor.

According to another aspect of the present disclosure, an aircraft propulsion system assembly includes a cockpit control system, an aircraft propulsion system, and a control assembly. The aircraft propulsion system includes a propulsor, an engine, and an electrical assembly. The engine includes a rotational assembly configured for rotation about an engine rotational axis of the engine. The rotational assembly is coupled to the propulsor. The electrical assembly includes an electric motor, a battery, and a battery management system. The electric motor includes a rotor. The rotor is coupled to the propulsor. The battery is electrically connected to the electric motor. The control assembly includes a propulsion train sensor assembly, a plurality of channel A control units, and at least one channel B control unit. The propulsion train sensor assembly includes a plurality of sensors configured to measure one or both of an engine rotation speed and an engine torque of the engine and one or both of an electric motor rotation speed and an electric motor torque of the electric motor. The propulsion train sensor assembly is connected in signal communication with the cockpit control system, the plurality of channel A control units, the at least one channel B control unit, and the battery management system. The plurality of channel A control units includes an engine control unit for the engine and an electric motor control unit for the electric motor. The engine control unit is configured to generate an output engine control signal for operation of the engine based on the one or both of the engine rotation speed and the engine torque. The electric motor control unit is configured to generate an output electric motor control signal for operation of the electric motor based on one or both of the electric motor rotation speed and the electric motor torque. The at least one channel B control unit includes a first processor connected in signal communication with a first non-transitory memory including instructions which, when executed by the first processor, cause the first processor to identify valid and invalid output control signals of the output engine control signal using the one or both of the engine rotation speed and the engine torque. The battery management system includes a second processor connected in signal communication with a second non-transitory memory including instructions which, when executed by the second processor, cause the second processor to identify valid and invalid output control signals of the output electric motor control signal using the one or both of the electric motor rotation speed and the electric motor torque.

In any of the aspects or embodiments described above and herein, the cockpit control system may include a manual override for the output engine control signal.

In any of the aspects or embodiments described above and herein, the cockpit control system may include a manual override for the output electric motor control signal.

In any of the aspects or embodiments described above and herein, the aircraft propulsion system may further include a gear box, and the gear box may couple the rotational assembly and the rotor to the propulsor.

In any of the aspects or embodiments described above and herein, the at least one channel B control unit may include a single channel B control unit. The single channel B control unit may be connected in signal communication with the engine control unit.

The present disclosure, and all its aspects, embodiments and advantages associated therewith will become more readily apparent in view of the detailed description provided below, including the accompanying drawings.

DETAILED DESCRIPTION

Figure 1:
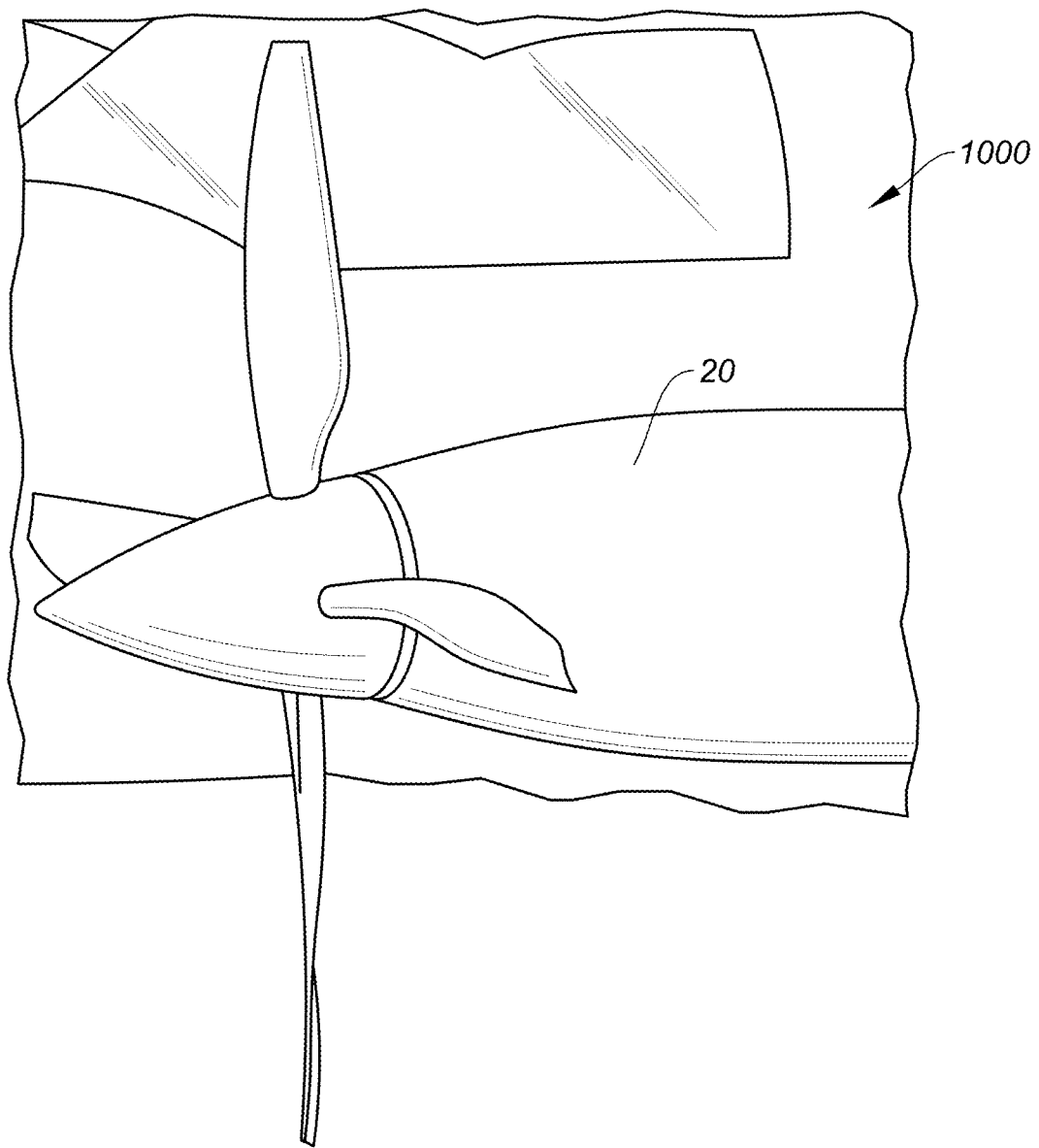
FIG. 1 illustrates an aircraft including a propulsion system, in accordance with one or more embodiments of the present disclosure.

FIG. 1 illustrates an aircraft 1000 including at least one propulsion system 20. Briefly, the aircraft may be a fixed-wing aircraft (e.g., an airplane), a rotary-wing aircraft (e.g., a helicopter), a tilt-rotor aircraft, a tilt-wing aircraft, or another aerial vehicle. Moreover, the aircraft may be a manned aerial vehicle or an unmanned aerial vehicle (UAV, e.g., a drone). The propulsion system 20 of FIG. 1 is a hybrid-electric propulsion system including an engine 22, an electrical assembly 24, a control assembly 26, and a propulsor 28.

Figure 2:
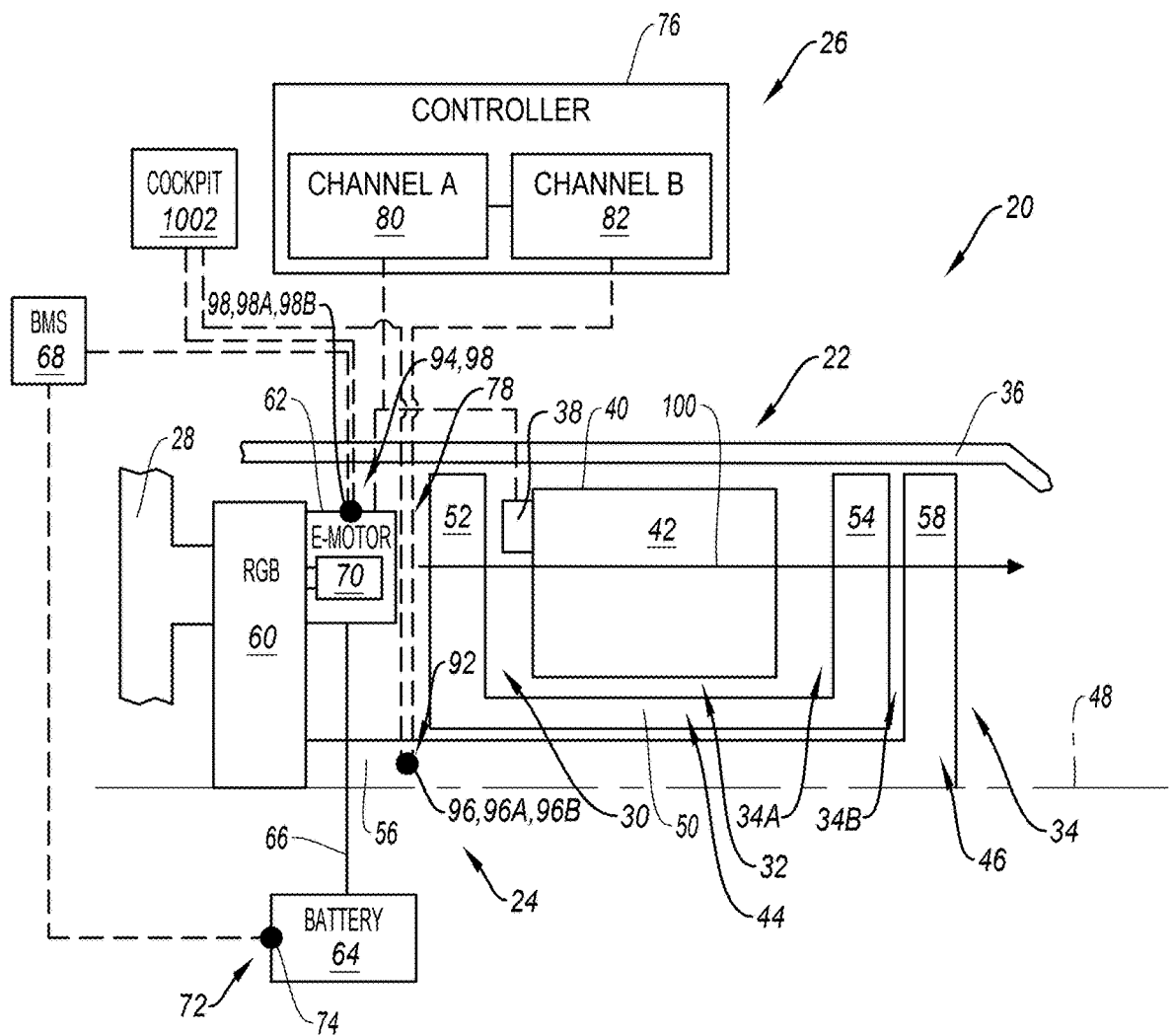
FIG. 2 schematically illustrates a cutaway, side view of an aircraft propulsion system, in accordance with one or more embodiments of the present disclosure.

FIG. 2 schematically illustrates a cutaway, side view of the propulsion system 20. The engine 22 of FIG. 2 is configured as a turboprop gas turbine engine. However, the present disclosure is not limited to any particular configuration of gas turbine engine for the propulsion system 20, and examples of gas turbine engine configurations for the propulsion system 20 may include, but are not limited to, a turbofan engine, a turbojet engine, a propfan engine, or the like. Moreover, the present disclosure is not limited to propulsion systems including a gas turbine engine. For example, the engine 22 may alternatively be configured as an intermittent combustion engine such as, but not limited to, a rotary engine (e.g., a Wankel engine), a piston engine, or the like.

The engine 22 of FIG. 2 includes a compressor section 30, a combustor section 32, a turbine section 34, and an engine static structure 36. The combustor section 32 includes a fuel injection assembly 38 and a combustor 40 (e.g., an annular combustor). The combustor 40 forms a combustion chamber 42. The turbine section 34 includes a high-pressure turbine section 34A and a power turbine section 34B.

Components of the compressor section 30 and the turbine section 34 of FIG. 2 form a first rotational assembly 44 (e.g., a high-pressure spool) and a second rotational assembly 46 of the engine 22. The first rotational assembly 44 and the second rotational assembly 46 are mounted for rotation about a rotational axis 48 (e.g., an axial centerline) of the engine 22 relative to the engine static structure 36.

The first rotational assembly 44 includes a first shaft 50, a bladed compressor rotor 52 for the compressor section 30, and a bladed turbine rotor 54 for the high-pressure turbine section 34A. The first shaft 50 interconnects the bladed compressor rotor 52 and the bladed turbine rotor 54.

The second rotational assembly 46 of FIG. 2 includes a second shaft 56 and a bladed power turbine rotor 58 for the power turbine section 34B. The second shaft 56 is connected to the bladed power turbine rotor 58. The second shaft 56 operably connects (e.g., directly or indirectly connects) the bladed power turbine rotor 58 with the propulsor 28.

The engine static structure 36 includes engine casings, cowlings, and other fixed (e.g., non-rotating) structures of the engine 22 which house and/or support components of the engine 22 such as, but not limited to, those of the compressor section 30, the combustor section 32, and the turbine section 34. The engine static structure 36 includes one or more bearing assemblies and/or gear trains configured to rotationally support and/or interconnect components of the first rotational assembly 44 and the second rotational assembly 46. The engine static structure 36 of FIG. 2 includes a gear box 60 coupling the second shaft 56 and the propulsor 28. For example, the gear box 60 includes a gear assembly (e.g., an epicyclic gear assembly) coupling the second shaft 56 and the propulsor 28. The gear assembly may be a reduction gear assembly configured to drive rotation of the propulsor 28 at a reduced rotational speed relative to the second shaft 56. Of course, the second shaft 56 may alternatively be directly connected to the propulsor 28 to drive the propulsor 28 at the same rotational speed as the second shaft 56.

The electrical assembly 24 of FIG. 2 includes an electric motor 62, a battery 64, an electrical distribution system 66, and a battery management system (BMS) 68.

The electric motor 62 is electrically connected to the electrical distribution system 66. The electric motor 62 includes a rotor 70. The rotor 70 is coupled to the propulsor 28 by the gear box 60. For example, the gear box 60 may couple both of the second shaft 56 and the rotor 70 to the propulsor 28 to facilitate driving rotation of the propulsor 28 with the bladed power turbine rotor 58 (e.g., via the second shaft 56), the electric motor 62 (e.g., the rotor 70), or a combination of the bladed power turbine rotor 58 and the electric motor 62. The electric motor 62 may additionally include a motor control unit (e.g., an inverter) configured to control electric power characteristics (e.g., frequency, voltage, current) supplied to the electric motor 62 (e.g., windings of the electric motor 62), for example, to control a rotation speed and/or torque of the rotor 70.

The battery 64 is electrically connected to the electrical distribution system 66. The battery 64 is configured to selectively supply electrical power to the electrical distribution system 66 independently (e.g., as a single power source for the electrical assembly 24) or in combination with one or more other electrical power sources (e.g., an electrical generator). The battery 64 may include a plurality of battery modules (e.g., battery packs), battery cells, and/or the like electrically connected together in series and/or parallel as necessary to configure the battery 64 with the desired electrical characteristics (e.g., voltage output, current output, storage capacity, etc.). The present disclosure is not limited to any particular configuration of the battery 64. The battery 64 (e.g., and its battery cells) may be configured as a rechargeable battery having a battery chemistry such as, but not limited to, lead acid, nickel cadmium (NiCd), nickel-metal hydride (Ni-MH), lithium-ion (Li-ion), lithium-polymer (Li-poly), lithium metal, and the like.

The electrical distribution system 66 electrically connects components of the electrical assembly 24. The electrical distribution system 66 includes switchgear, cables, wires, breakers, switches, electrical power conditional and/or conversion (e.g., AC to DC or DC to AC conversion) components, and/or other electrical components to effect the transfer of electrical power between components of the electrical assembly 24. The electrical distribution system 66 may additionally include one or more electrical power controllers, for example, to control a magnitude and/or direction of electrical current flow to components of the electrical assembly 24. The electrical distribution system 66 is configured to supply electrical power to electrical loads of the aircraft 1000, the propulsion system 20, and/or the engine 22.

The battery management system 68 is configured to monitor conditions of the battery 64 (e.g., state of charge, state of health, temperature, etc.) and to control battery 64 functions (e.g., cell and/or module power distribution, thermal management, cell balancing, battery charging, etc.). The battery management system 68 includes and is connected in signal communication with a battery sensor assembly 72. The battery sensor assembly 72 includes a plurality of battery sensors 74. The plurality of battery sensors 74 includes sensors such as, but not limited to, voltage sensors, temperature sensors, coolant temperature and/or flow sensors, current sensors, and the like. The battery management system 68 may additionally be connected in signal communication with one or more sensors for the electric motor 62, as will be discussed in further detail.

The control assembly 26 includes a controller 76 and a propulsion train sensor assembly 78. The controller 76 may form or otherwise be part of an electronic engine controller (EEC) for the engine 22. The EEC may control operating parameters of the engine 22 including, but not limited to, fuel flow, stator vane position (e.g., variable compressor inlet guide vane (IGV) position), compressor air bleed valve position, shaft (e.g., first shaft 50 and/or second shaft 56) torque and/or rotation speed, etc. so as to control an engine power or performance of the propulsion system 20. For example, the EEC may control the fuel injection assembly 38 to modulate fuel flow to the combustor 40 to obtain a desired output power of the engine 22. In some embodiments, the EEC may be part of a full authority digital engine control (FADEC) system for the engine 22.

The controller 76 of FIG. 2 is configured as a dual-channel controller. For example, the controller 76 of FIG. 2 includes one or more channel A control units 80 and one or more channel B control units 82. As will be discussed in further detail, the channel A control units 80 may control respective power outputs of the engine 22 and the electric motor 62 applied to the propulsor 28 to control a thrust output of the propulsion system 20 as well as respective loading conditions of the engine 22 and the electric motor 62. In contrast, the channel B control units 82 may monitor propulsion train parameters of the propulsion system 20 (e.g., parameters measured using the propulsion train sensor assembly 78) as well as control signal outputs of the channel A control units 80 (e.g., for controlling operation of the engine 22 and the electric motor 62) to verify proper operation of the channel A control units 80 during operation of the propulsion system 20. In some embodiments, the channel B control units 82 may be configured to assume control of the engine 22 and/or the electric motor 62 in response to identifying a failure or degraded operation of one or more of the channel A control units 80. For example, the channel B control units 82 may have limited control functionality for the engine 22 to control an emergency shut down or to perform other basic engine 22 control functions if the channel B control units 82 identify improper operation of the channel A control units 80.

Figure 3:
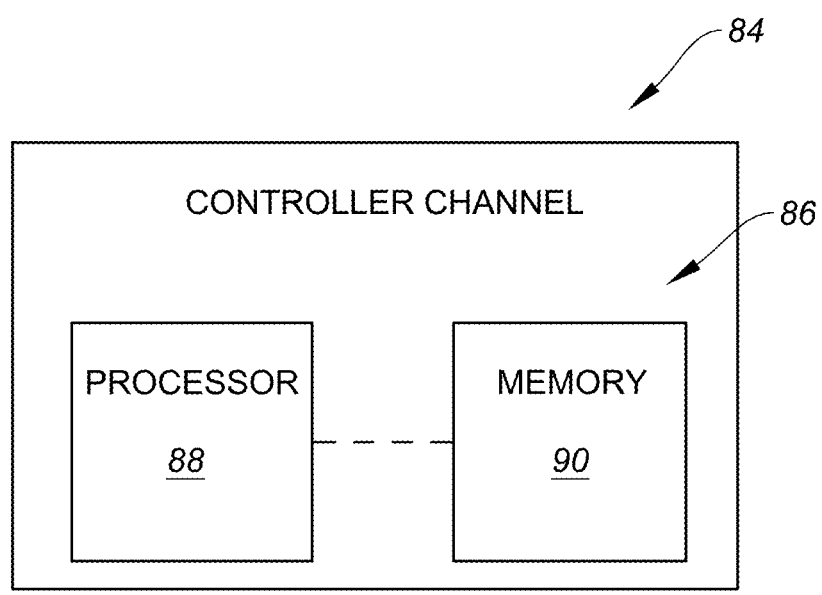
FIG. 3 illustrates a control unit for an aircraft propulsion system control assembly, in accordance with one or more embodiments of the present disclosure.

FIG. 3 schematically illustrates a control unit 84. The control unit 84 of FIG. 3 may be used for one, more than one, or each of the channel A control units 80, the channel B control units 82, and the battery management system 68. For example, each of the channel A control units 80, the channel B control units 82, and the battery management system 68 may include the control unit 84 such that each of the channel A control units 80, the channel B control units 82, and the battery management system 68 includes a processing system 86 which is independent of the processing system 86 of each other one of the channel A control units 80, the channel B control units 82, and the battery management system 68. The processing system 86 of the control unit 84 includes a processor 88 connected in signal communication with memory 90. The processor 88 may include any type of computing device, computational circuit, processor(s), central processing unit (CPU), graphics processing unit (GPU), computer, or the like capable of executing a series of instructions that are stored in memory 90. Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. The instructions may include an operating system, and/or executable software modules such as program files, system data, buffers, drivers, utilities, and the like. The executable instructions may apply to any functionality described herein to enable the control unit 84 to accomplish the same algorithmically and/or coordination of propulsion system 20 components. The memory 90 may include a single memory device or a plurality of memory devices (e.g., a computer-readable storage device that can be read, written, or otherwise accessed by a general purpose or special purpose computing device, including any processing electronics and/or processing circuitry capable of executing instructions). The present disclosure is not limited to any particular type of memory device, which may be non-transitory, and may include read-only memory, random access memory, volatile memory, non-volatile memory, static memory, dynamic memory, flash memory, cache memory, volatile or non-volatile semiconductor memory, optical disk storage, magnetic disk storage, magnetic tape, other magnetic storage devices, or any other medium capable of storing one or more instructions, and/or any device that stores digital information. The memory device(s) may be directly and/or indirectly coupled to the control unit 84. The control unit 84 may include, or may be in communication with, a user interface including one or more inputs devices and/or one or more output devices, for example, an input device that enables a user to enter data and/or instructions and an output device configured to display information (e.g., a visual display or a printer), or to transfer data, etc. Communications between the control unit 84 and external electrical or electronic devices may be via a hardwire connection or via a wireless connection. A person of skill in the art will recognize that portions of the control unit 84 may assume various forms (e.g., digital signal processor, analog device, etc.) capable of performing the functions described herein.

The propulsion train sensor assembly 78 includes an engine sensor subassembly 92 and an electric motor sensor subassembly 94. The engine sensor subassembly 92 includes a plurality of engine sensors 96. The engine sensors 96 include one or more channel A sensors 96A and one or more channel B sensors 96B. The channel A sensors 96A and the channel B sensors 96B are configured to measure operational parameters of the engine 22 (e.g., the first rotational assembly 44 and/or the second rotational assembly 46). Each of the channel A sensors 96A and the channel B sensors 96B may include a rotation speed sensor, a torque sensor, a vibration sensor, or the like configured to measure operational parameters of the engine 22. The channel A sensors 96A and the channel B sensors 96B of FIG. 2 are disposed at the second rotational assembly 46, for example, to measure a rotation speed, torque, and/or vibration of the second shaft 56. The channel A sensors 96A are connected in signal communication with a cockpit control system 1002 of the aircraft 1000. For example, operational parameters of the engine 22 measured by the channel A sensors 96A may be displayed on a cockpit display or other instrumentation of the cockpit control system 1002 for a pilot or other operator of the aircraft 1000 to facilitate control of the aircraft 1000 and its propulsion system(s) 20. The channel B sensors 96B are connected in signal communication with the channel B control units 82.

The electric motor sensor subassembly 94 includes a plurality of electric motor sensors 98. The electric motor sensors 98 include one or more channel A sensors 98A and one or more channel B sensors 98B. The channel A sensors 98A and the channel B sensors 98B are configured to measure operational parameters of the electric motor 62 (e.g., the rotor 70). Each of the channel A sensors 98A and the channel B sensors 98B may include a rotation speed sensor, a torque sensor, a vibration sensor, or the like configured to measure operational parameters of the electric motor 62. The channel A sensors 98A are connected in signal communication with the cockpit control system 1002. For example, operational parameters of the electric motor 62 measured by the channel A sensors 98A may be displayed on a cockpit display or other instrumentation of the cockpit control system 1002 for a pilot or other operator of the aircraft 1000 to facilitate control of the aircraft 1000 and its propulsion system(s) 20. The channel B sensors 96B are connected in signal communication with the battery management system 68.

During operation of the propulsion system 20 of FIG. 2, ambient air enters the propulsion system 20 through an air intake into and through a core flow path 100 of the engine 22. The ambient air flow along the core flow path 100 is compressed in the compressor section 30 and directed into the combustion chamber 42 of the combustor 40 within the combustor section 32. The fuel injection assembly 38 injects fuel into the combustion chamber 42. The fuel is mixed with the compressed air to provide a fuel-air mixture. This fuel-air mixture is ignited, and combustion products thereof flow through the high-pressure turbine section 34A and the power turbine section 34B, and are exhausted from the propulsion system 20. The bladed turbine rotor 54 and the bladed power turbine rotor 58 rotationally drive the first rotational assembly 44 and the second rotational assembly 46, respectively, in response to the combustion gas flow through the high-pressure turbine section 34A and the power turbine section 34B. The second rotational assembly 46 (e.g., the second shaft 56) may drive rotation of the propulsor 28, for example, through the gear box 60. The electric motor 62 may be selectively operated (e.g., electrically driven) to drive rotation of the propulsor 28 independently or in combination with the engine 22.

As will be discussed in further detail, operation of the engine 22 and the electric motor 62 may be controlled by the channel A control units 80. For example, the channel A control units 80 may receive one or more command signals from the cockpit control system 1002 (e.g., the throttles operated by a pilot) and generate and direct one or more output control signals (e.g., to the fuel injection assembly 38 and/or the electric motor 62) to control operation of the engine 22 and/or the electric motor 62 to establish a commanded propulsor 28 or other propulsion system 20 response. The channel B control units 82 and the battery management system 68 monitor performance of the channel A control units 80 for controlling operation of the engine 22 and the electric motor 62, respectively. The channel B control units 82 may directly process measurement signals from the channel B sensors 96B to evaluate the channel A control units 80 performance (e.g., output control signals) in response to command signals from the cockpit control system 1002. Similarly, the battery management system 68 may directly process measurement signals from the channel B sensors 98B to evaluate the channel A control units 80 performance (e.g., output control signals) in response to command signals from the cockpit control system 1002. The battery management system 68 may have limited control functionality for the electric motor 62. For example, the battery management system 68 may be configured to shut down (e.g., deenergize) the electric motor 62 in response to identification of improper operation of the electric motor 62 (e.g., an overtorque condition caused by uncommanded operation of the electric motor 62).

Figure 4:
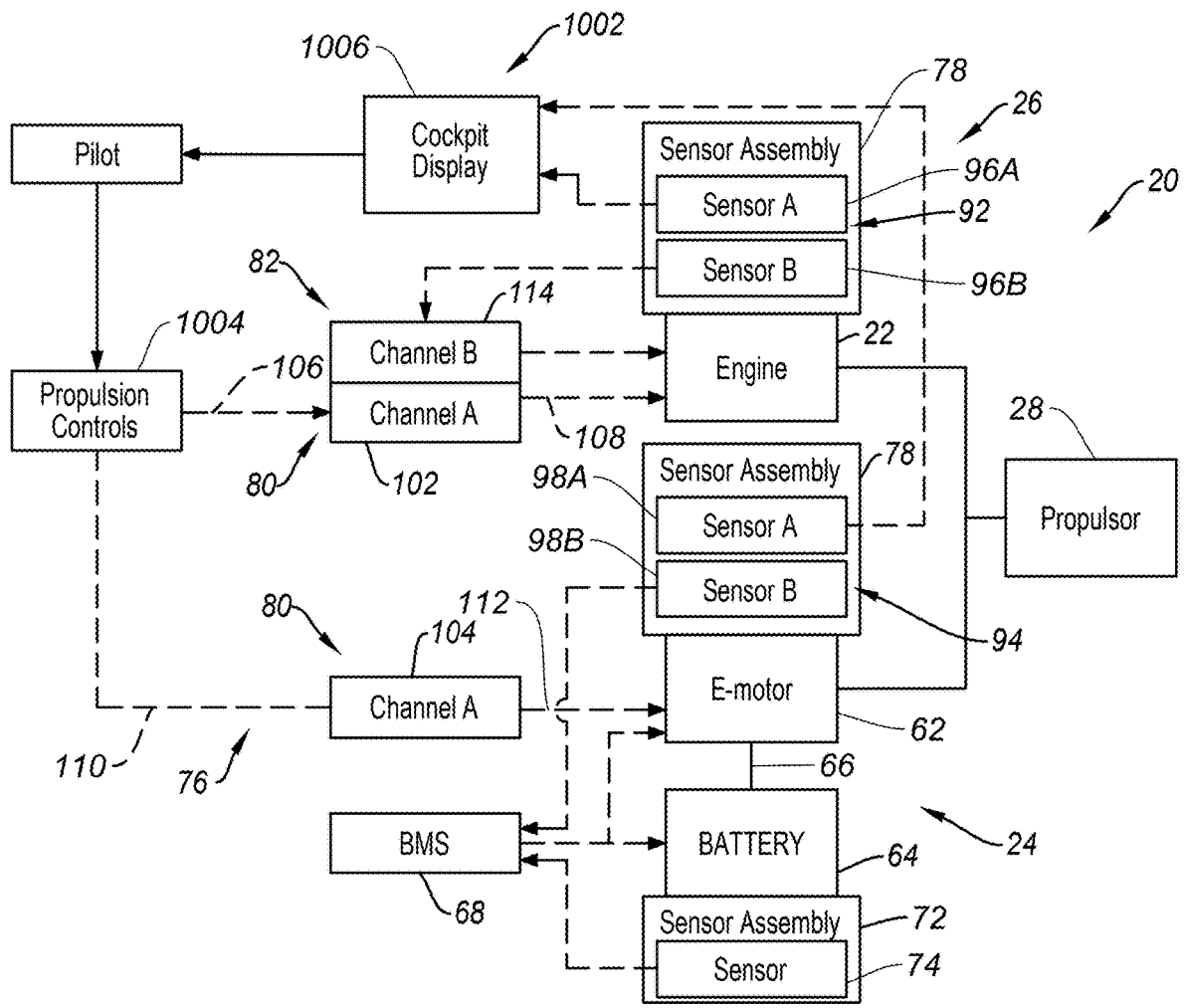
FIG. 4 schematically illustrates an aircraft propulsion system control assembly, in accordance with one or more embodiments of the present disclosure.

FIG. 4 schematically illustrates an embodiment of the electrical assembly 24 and the control assembly 26. The channel A control units 80 of FIG. 4 include an engine control unit 102 and an electric motor control unit 104. The engine control unit 102 is configured to control operation of the engine 22 by controlling a power output of the engine 22 to the propulsor 28, for example, as discussed above. The engine control unit 102 may receive a command signal 106 from propulsion controls 1004 (e.g., a pilot-operated control device) of the cockpit control system 1002 and generate and direct one or more output control signals 108 to the engine 22 (e.g., the fuel injection assembly 38) to control operation of the engine 22 (see FIG. 2). The electric motor control unit 104 is configured to control operation of the electric motor 62 by controlling a power output of the electric motor 62 to the propulsor 28, for example, as discussed above. The electric motor control unit 104 may receive a command signal 110 from the propulsion controls 1004 and generate and direct one or more output control signals 112 to the electric motor 62 to control operation of the electric motor 62 (see FIG. 2). Measured operating parameters of the engine 22, from the channel A sensors 96A, may be displayed on a cockpit display 1006 of the cockpit control system 1002 for evaluation by a pilot. The channel B control units 82 of FIG. 4 include a single channel B control unit 114. The channel B control unit 114 is configured to monitor performance of the engine control unit 102 for controlling operation of the engine 22. For example, the channel B control unit 114 may be configured to directly process measurement signals from the channel B sensors 96B to evaluate the engine control unit 102 control signals 108 in response to the command signal 106 from the propulsion controls 1004. Measured operating parameters of the electric motor 62, from the channel A sensors 98A, may be displayed on a cockpit display 1006 of the cockpit control system 1002 for evaluation by a pilot. The battery management system 68 of FIG. 4 is configured to monitor performance of the electric motor control unit 104 for controlling operation of the electric motor 62. For example, the battery management system 68 may be configured to directly process measurement signals from the channel B sensors 98B to evaluate the electric motor control unit 104 control signals 112 in response to the command signal 110 from the propulsion controls 1004. The battery management system 68 may have limited control functionality for the electric motor 62. For example, the battery management system 68 may be configured to shut down (e.g., deenergize) the electric motor 62 in response to identification of improper operation of the electric motor 62 (e.g., an overtorque condition caused by uncommanded operation of the electric motor 62 or an invalid output control signal to the electric motor 62).

The configuration of the battery management system 68 facilitates a reduced quantity of control units (e.g., the control unit 84) used for independent monitoring of the engine control unit 102 and the electric motor control unit 102 by performing monitoring functions for the electric control unit 102 without the use of an additional channel B control unit. Accordingly, the present disclosure configuration of the battery management system 68 may facilitate reduced propulsion system 20 weight, cost, and complexity, at least in comparison to some conventional control systems for hybrid-electric propulsion systems which may monitor operation and control of an engine and electric motor using discrete, independent control units.

Figure 5:
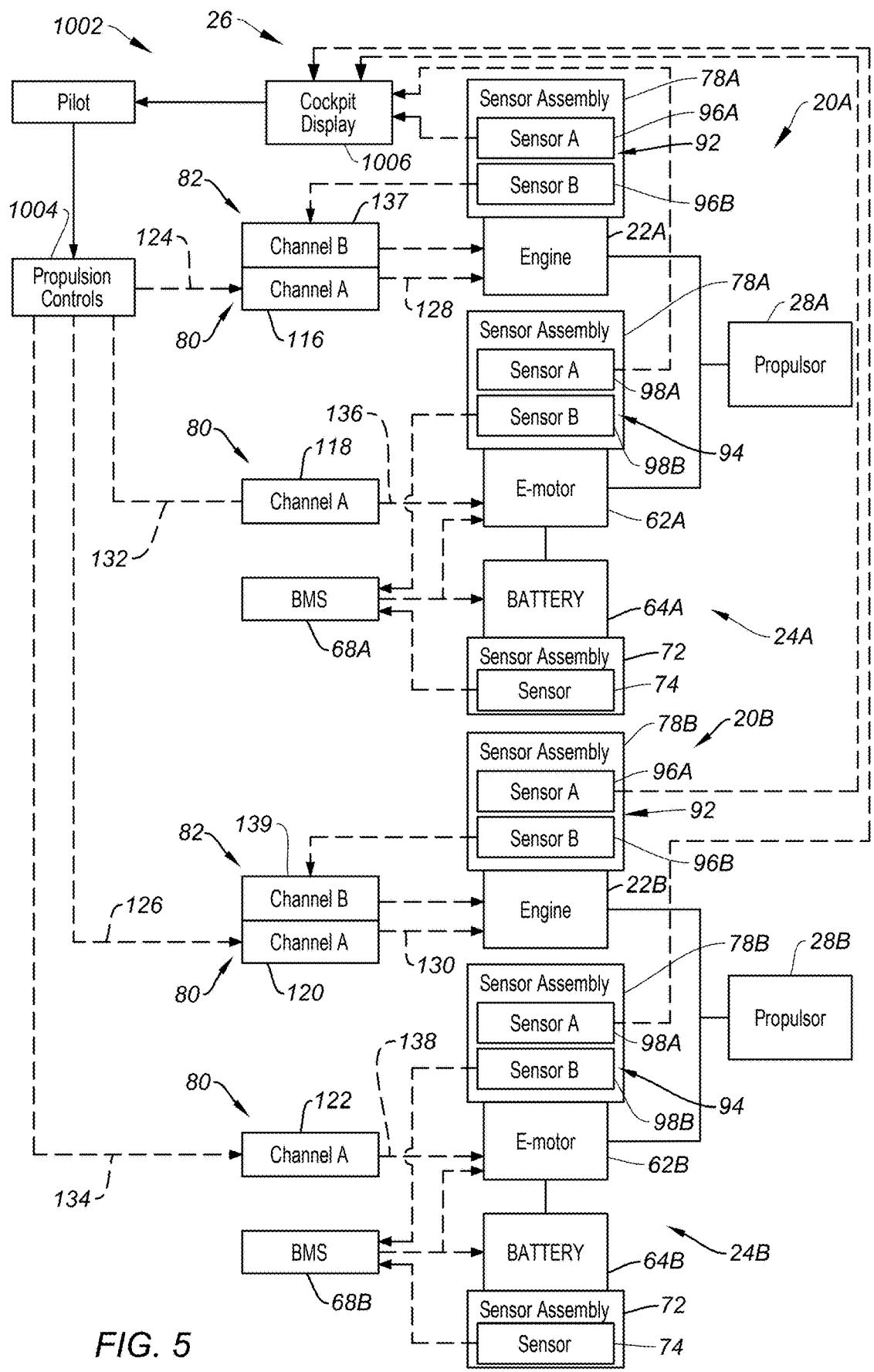
FIG. 5 schematically illustrates another aircraft propulsion system control assembly, in accordance with one or more embodiments of the present disclosure.

FIG. 5 schematically illustrates another embodiment of the control assembly 26 for an aircraft (e.g., the aircraft 1000 of FIG. 1) including two propulsion systems 20-a first propulsion system 20A and a second propulsion system 20B. The first propulsion system 20A includes a first engine 22A and a first electric motor 62A coupled with a first propulsor 28A. The second propulsion system 20B includes a second engine 22B and a second electric motor 62B coupled with a second propulsor 28B. The first propulsion system 20A includes a first electrical assembly 24A and the second propulsion system 20B includes a second electrical assembly 24B. The first electrical assembly 24A and the second electrical assembly 24B may be electrically interconnected or electrically isolated from one another. Each of the electrical assemblies 24A, 24B respectively includes a battery 64A, 64B and a battery management system 68A, 68B. The control assembly 26 includes a first propulsion train sensor assembly 78A for the first propulsion system 20A and a second propulsion train sensor assembly 78B for the second propulsion system 20B. The channel A control units 80 of FIG. 5 include a first engine control unit 116 for the first engine 22A, a first electric motor control unit 118 for the first electric motor 62A, a second engine control unit 120 for the second engine 22B, and a second electric motor control unit 122 for the second electric motor 62B. The engine control units 116, 120 are respectively configured to control operation of the engines 22A, 22B by controlling a power output of the engines 22A, 22B to the propulsors 28A, 28B, for example, as discussed above. Each of the engine control units 116, 120 may receive a respective command signal 124, 126 from the propulsion controls 1004 and generate and direct one or more respective output control signals 128, 130 to the engines 22A, 22B to control operation of the engines 22A, 22B. The electric motor control units 118, 122 are respectively configured to control operation of the electric motors 62A, 62B by controlling a power output of the electric motors 62A, 62B to the propulsors 28A, 28B, for example, as discussed above. Each of the electric motor control units 118, 122 may receive a respective command signal 132, 134 from the propulsion controls 1004 and generate and direct one or more respective output control signals 136, 138 to the electric motors 62A, 62B to control operation of the electric motors 62A, 62B.

The channel B control units 82 of FIG. 5 include a first channel B control unit 137 and a second channel B control unit 139. The first channel B control unit 137 is configured to monitor performance of the first engine control unit 116 for controlling operation of the engine 22A. For example, the first channel B control unit 137 may be configured to directly process measurement signals from the channel B sensors 96B of the engine sensor subassembly 92 for the first propulsion train sensor assembly 78A to evaluate the first engine control unit 116 control signals 128 in response to the command signal 124 from the propulsion controls 1004. The second channel B control unit 139 is configured to monitor performance of the second engine control unit 120 for controlling operation of the engine 22B. For example, the second channel B control unit 139 may be configured to directly process measurement signals from the channel B sensors 96B of the engine sensor subassembly 92 for the second propulsion train sensor assembly 78B to evaluate the second engine control unit 120 control signals 130 in response to the command signal 126 from the propulsion controls 1004. The battery management system 68A is configured to monitor performance of the first electric motor control unit 118 for controlling operation of the first electric motor 62A. The battery management system 68A is configured to directly process measurement signals from the channel B sensors 98B for the first electric motor 62A to evaluate the first electric motor control unit 118 control signals 136 in response to the command signal 132 from the propulsion controls 1004. The battery management system 68B is configured to monitor performance of the second electric motor control unit 122 for controlling operation of the second electric motor 62B. The battery management system 68B is configured to directly process measurement signals from the channel B sensors 98B for the second electric motor 62B to evaluate the second electric motor control unit 122 control signals 138 in response to the command signal 134 from the propulsion controls 1004.

Figure 6:
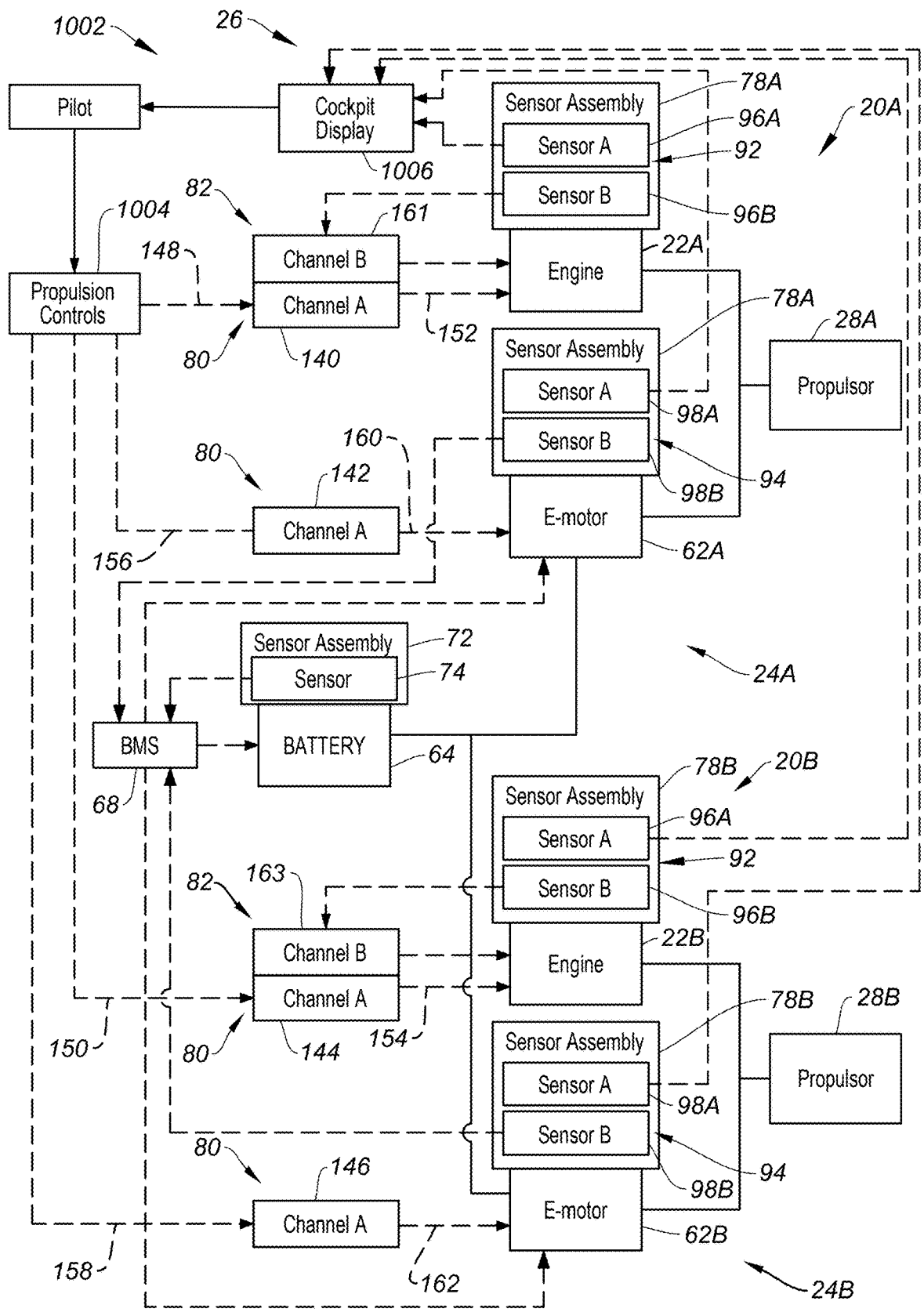
FIG. 6 schematically illustrates another aircraft propulsion system control assembly, in accordance with one or more embodiments of the present disclosure.

FIG. 6 schematically illustrates another embodiment of the electrical assembly 24 and the control assembly 26 for an aircraft (e.g., the aircraft 1000 of FIG. 1) including two propulsion systems 20—the first propulsion system 20A and the second propulsion system 20B. The first propulsion system 20A includes the first engine 22A and the first electric motor 62A coupled with the first propulsor 28A. The second propulsion system 20B includes the second engine 22B and the second electric motor 62B coupled with the second propulsor 28B. The first propulsion system 20A includes the first electrical assembly 24A and the second propulsion system 20B includes the second electrical assembly 24B. The first electrical assembly 24A and the second electrical assembly 24B may are electrically interconnected. The first electrical assembly 24A and the second electrical assembly 24B collectively include the battery 64 and the battery management system 68 (e.g., a single battery and a single battery management system). The control assembly 26 includes the first propulsion train sensor assembly 78A for the first propulsion system 20A and the second propulsion train sensor assembly 78B for the second propulsion system 20B. The channel A control units 80 of FIG. 6 include a first engine control unit 140 for the first engine 22A, a first electric motor control unit 142 for the first electric motor 62A, a second engine control unit 144 for the second engine 22B, and a second electric motor control unit 146 for the second electric motor 62B. The engine control units 140, 144 are respectively configured to control operation of the engines 22A, 22B by controlling a power output of the engines 22A, 22B to the propulsors 28A, 28B, for example, as discussed above. Each of the engine control units 140, 144 may receive a respective command signal 148, 150 from the propulsion controls 1004 and generate and direct one or more respective output control signals 152, 154 to the engines 22A, 22B to control operation of the engines 22A, 22B. The electric motor control units 142, 146 are respectively configured to control operation of the electric motors 62A, 62B by controlling a power output of the electric motors 62A, 62B to the propulsors 28A, 28B, for example, as discussed above. Each of the electric motor control units 142, 146 may receive a respective command signal 156, 158 from the propulsion controls 1004 and generate and direct one or more respective output control signals 160, 162 to the electric motors 62A, 62B to control operation of the electric motors 62A, 62B.

The channel B control units 82 of FIG. 6 include a first channel B control unit 161 and a second channel B control unit 163. The first channel B control unit 161 is configured to monitor performance of the first engine control unit 140 for controlling operation of the engine 22A. For example, the first channel B control unit 161 may be configured to directly process measurement signals from the channel B sensors 96B of the engine sensor subassembly 92 for the first propulsion train sensor assembly 78A to evaluate the first engine control unit 140 control signals 152 in response to the command signal 148 from the propulsion controls 1004. The second channel B control unit 163 is configured to monitor performance of the second engine control unit 144 for controlling operation of the engine 22B. For example, the second channel B control unit 163 may be configured to directly process measurement signals from the channel B sensors 96B of the engine sensor subassembly 92 for the second propulsion train sensor assembly 78B to evaluate the second engine control unit 144 control signals 154 in response to the command signal 150 from the propulsion controls 1004. The battery management system 68 is configured to monitor performance of the first electric motor control unit 142 and the second electric motor control unit 146 for controlling operation of the first electric motor 62A and the second electric motor 62B, respectively. The battery management system 68 is configured to directly process measurement signals from the channel B sensors 98B for the first electric motor 62A to evaluate the first electric motor control unit 142 control signals 160 in response to the command signal 156 from the propulsion controls 1004. The battery management system 68 is also configured to directly process measurement signals from the channel B sensors 98B for the second electric motor 62B to evaluate the second electric motor control unit 146 control signals 162 in response to the command signal 158 from the propulsion controls 1004. The configuration of the electrical assembly 24 and the control assembly 26 of FIG. 6 facilitates a further reduced quantity of control units (e.g., the control unit 84) used for independent monitoring of the first electric motor control unit 142 and the second electric motor control unit 146 by performing monitoring functions without the use of an additional channel B control unit. Accordingly, the present disclosure may facilitate reduced propulsion system 20 weight, cost, and complexity, at least in comparison to some conventional control systems for hybrid-electric propulsion systems which may monitor operation and control of an engine and electric motor using discrete, independent control units.

Figure 7:
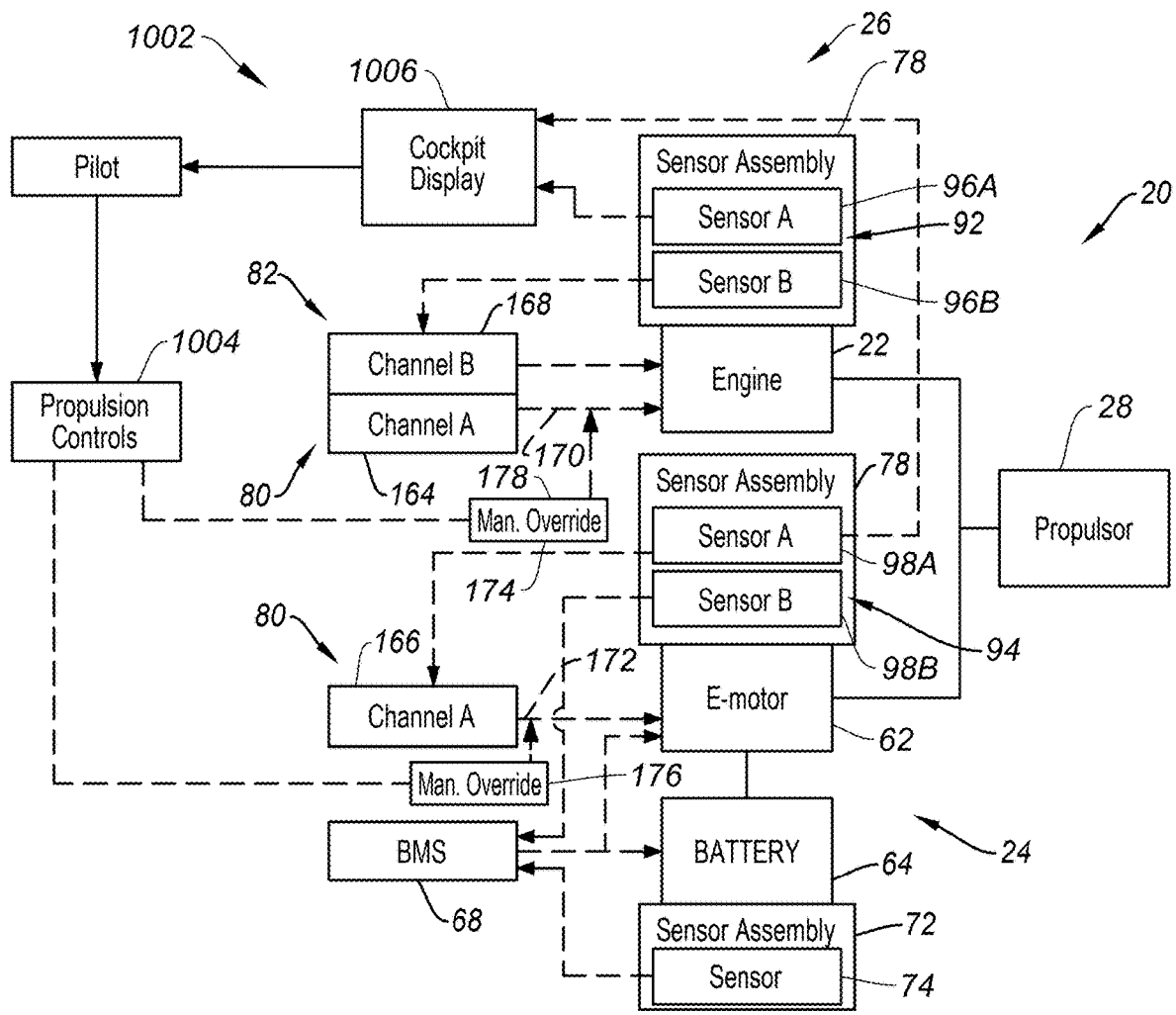
FIG. 7 schematically illustrates another aircraft propulsion system control assembly, in accordance with one or more embodiments of the present disclosure.

FIG. 7 schematically illustrates another embodiment of the electrical assembly 24 and the control assembly 26. The channel A control units 80 of FIG. 7 include an engine control unit 164 and an electric motor control unit 166. The channel B control units 82 of FIG. 7 include a single channel B control unit 168. The engine control unit 164 is configured to control operation of the engine 22 by controlling a power output of the engine 22 to the propulsor 28 using measured operating parameters of the engine 22 from the channel A sensors 96A (e.g., based on a propulsion flight plan or other automated propulsion control sequence, algorithm, model, or the like). The engine control unit 164 of FIG. 7 generates and directs one or more output control signals 170 to the engine 22 (e.g., the fuel injection assembly 38) to control operation of the engine 22 (see FIG. 2). The electric motor control unit 166 is configured to control operation of the electric motor 62 by controlling a power output of the electric motor 62 to the propulsor 28 using measured operating parameters of the electric motor 62 from the channel A sensors 98A (e.g., based on a propulsion flight plan or other automated propulsion control sequence, algorithm, model, or the like). The electric motor control unit 166 generates and directs one or more output control signals 172 to the electric motor 62 to control operation of the electric motor 62. Measured operating parameters of the engine 22, from the channel A sensors 96A, 98A, may be displayed on a cockpit display 1006 of the cockpit control system 1002 for evaluation by a pilot. The channel B control unit 168 is configured to monitor performance of the engine control unit 164 for controlling operation of the engine 22. The channel B control unit 168 is configured to directly process measurement signals from channel B sensors 96B to evaluate the engine control unit 164 control signals 170 in response to the measured operating parameters of the engine 22 from the channel A sensors 96A. The battery management system 68 is configured to monitor performance of the electric motor control unit 166 for controlling operation of the electric motor 62. The battery management system 68 is configured to directly process measurement signals from channel B sensors 98B to evaluate the electric motor control unit 166 control signals 172 in response to the measured operating parameters of the electric motor 62 from the channel A sensors 98A. The cockpit control system 1002 of FIG. 7 may additionally include an engine manual override 174. The engine manual override 174 may facilitate manual control of the engine 22 by the propulsion controls 1004, for example, in response to a failure or other degradation of the engine control unit 164. Similarly, the cockpit control system 1002 of FIG. 7 may additionally include an electric motor manual override 176. The electric motor manual override 176 may facilitate manual control of the electric motor 62 by the propulsion controls 1004.

Figure 8:
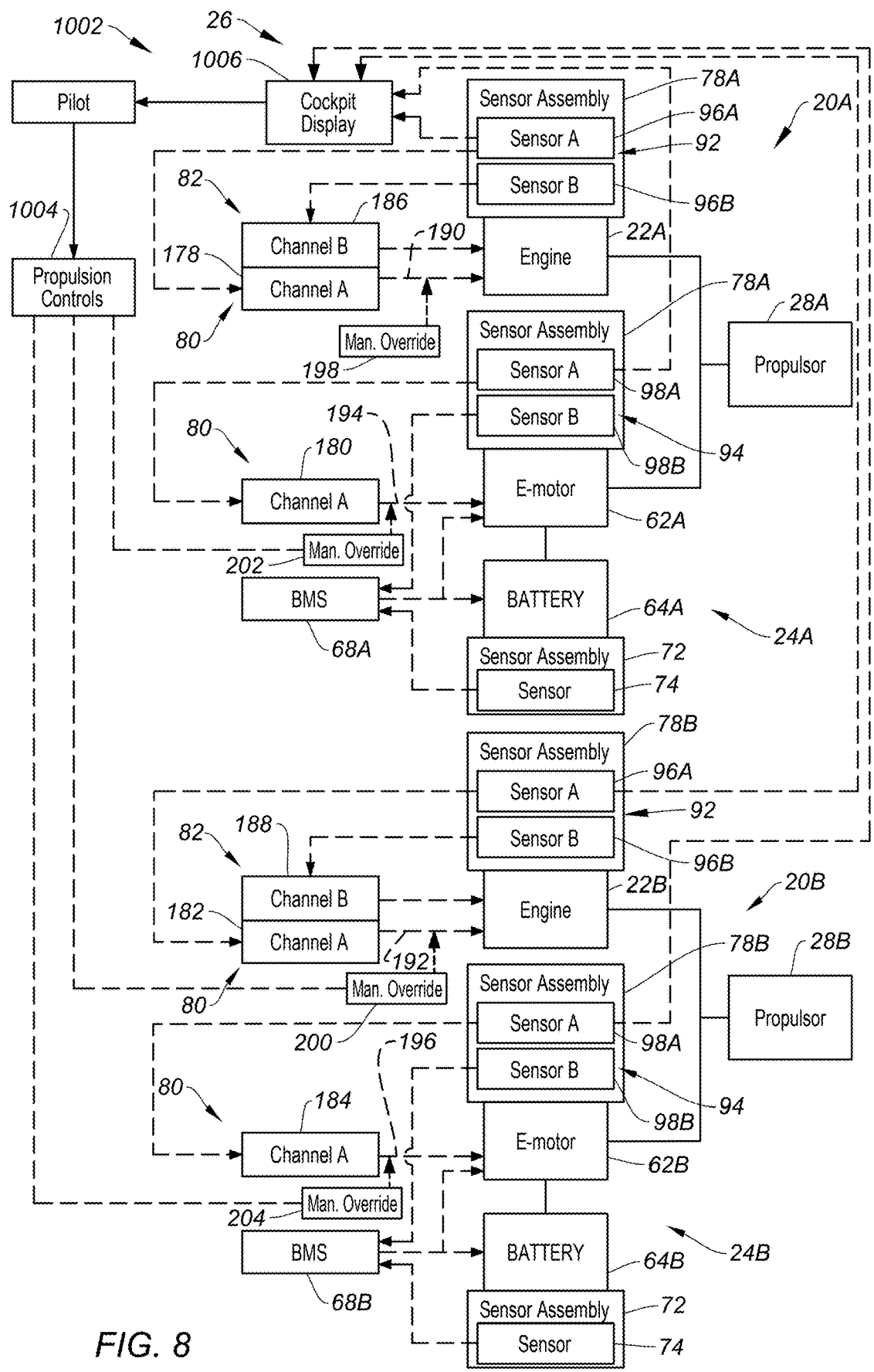
FIG. 8 schematically illustrates another aircraft propulsion system control assembly, in accordance with one or more embodiments of the present disclosure.

FIG. 8 schematically illustrates another embodiment of the electrical assembly 24 and the control assembly 26 for an aircraft (e.g., the aircraft 1000 of FIG. 1) including two propulsion systems 20—the first propulsion system 20A and the second propulsion system 20B. The first propulsion system 20A includes the first engine 22A and the first electric motor 62A coupled with the first propulsor 28A. The second propulsion system 20B includes the second engine 22B and the second electric motor 62B coupled with the second propulsor 28B. The first propulsion system 20A includes the first electrical assembly 24A and the second propulsion system 20B includes the second electrical assembly 24B. The first electrical assembly 24A and the second electrical assembly 24B may be electrically interconnected or electrically isolated from one another. Each of the electrical assemblies 24A, 24B respectively includes the battery 64A, 64B and the battery management system 68A, 68B. The control assembly 26 includes the first propulsion train sensor assembly 78A for the first propulsion system 20A and the second propulsion train sensor assembly 78B for the second propulsion system 20B. The channel A control units 80 of FIG. 8 include a first engine control unit 178 for the first engine 22A, a first electric motor control unit 180 for the first electric motor 62A, a second engine control unit 182 for the second engine 22B, and a second electric motor control unit 184 for the second electric motor 62B. The engine control units 178, 182 are respectively configured to control operation of the engines 22A, 22B by controlling a power output of the engines 22A, 22B to the propulsors 28A, 28B, for example, as discussed above. Each of the engine control units 178, 182 is configured to respectively control operation of the engines 22A, 22B by controlling a power output of the engines 22A, 22B to the propulsors 28A, 28B using measured operating parameters of engines 22A, 22B from the channel A sensors 96A of the first propulsion train sensor assembly 78A and the second propulsion train sensor assembly 78B. Each of the electric motor control units 180, 184 is configured to respectively control operation of the electric motors 62A, 62B by controlling a power output of the electric motors 62A, 62B to the propulsors 28A, 28B using measured operating parameters of electric motors 62A, 62B from the channel A sensors 98A of the first propulsion train sensor assembly 78A and the second propulsion train sensor assembly 78B.

The channel B control units 82 of FIG. 8 include a first channel B control unit 186 and a second channel B control unit 188. The first channel B control unit 186 is configured to monitor performance of the first engine control unit 178 for controlling operation of the first engine 22A. For example, the first channel B control unit 186 may be configured to directly process measurement signals from the channel B sensors 96B of the engine sensor subassembly 92 for the first propulsion train sensor assembly 78A to evaluate the first engine control unit 178 control signals 190 in response the measured operating parameters of the first engine 22A from the channel A sensors 96A of the engine sensor subassembly 92 for the first propulsion train sensor assembly 78A. The second channel B control unit 188 is configured to monitor performance of the second engine control unit 182 for controlling operation of the second engine 22B. For example, the second channel B control unit 188 may be configured to directly process measurement signals from the channel B sensors 96B of the engine sensor subassembly 92 for the second propulsion train sensor assembly 78B to evaluate the second engine control unit 182 control signals 192 in response the measured operating parameters of the second engine 22B from the channel A sensors 96A of the engine sensor subassembly 92 for the second propulsion train sensor assembly 78B. The battery management system 68A is configured to monitor performance of the first electric motor control unit 180 for controlling operation of the first electric motor 62A. The battery management system 68A is configured to directly process measurement signals from the channel B sensors 98B of the electric motor sensor subassembly 94 for the first propulsion train sensor assembly 78A to evaluate the first electric motor control unit 180 control signals 194 in response the measured operating parameters of the first electric motor 62A from the channel A sensors 98A of the engine sensor subassembly 92 for the first propulsion train sensor assembly 78A. The battery management system 68B is configured to monitor performance of the second electric motor control unit 184 for controlling operation of the second electric motor 62B. The battery management system 68B is configured to directly process measurement signals from the channel B sensors 98B of the electric motor sensor subassembly 94 for the second propulsion train sensor assembly 78B to evaluate the second electric motor control unit 184 control signals 196 in response the measured operating parameters of the second electric motor 62B from the channel A sensors 98A of the engine sensor subassembly 92 for the second propulsion train sensor assembly 78B. The cockpit control system 1002 of FIG. 8 may additionally include a first engine manual override 198 and a second engine manual override 200. The first engine manual override 198 and the second engine manual override 200 may facilitate manual control of the first engine 22A and the second engine 22B, respectively, by the propulsion controls 1004, for example, in response to a failure or other degradation of the first engine control unit 178 and/or the second engine control unit 182. Similarly, the cockpit control system 1002 of FIG. 8 may additionally include a first electric motor manual override 202 and a second electric motor manual override 204. The first electric motor manual override 202 and the second electric motor manual override 204 may facilitate manual control of the first electric motor 62A and the second electric motor 62B, respectively, by the propulsion controls 1004.

Figure 9:
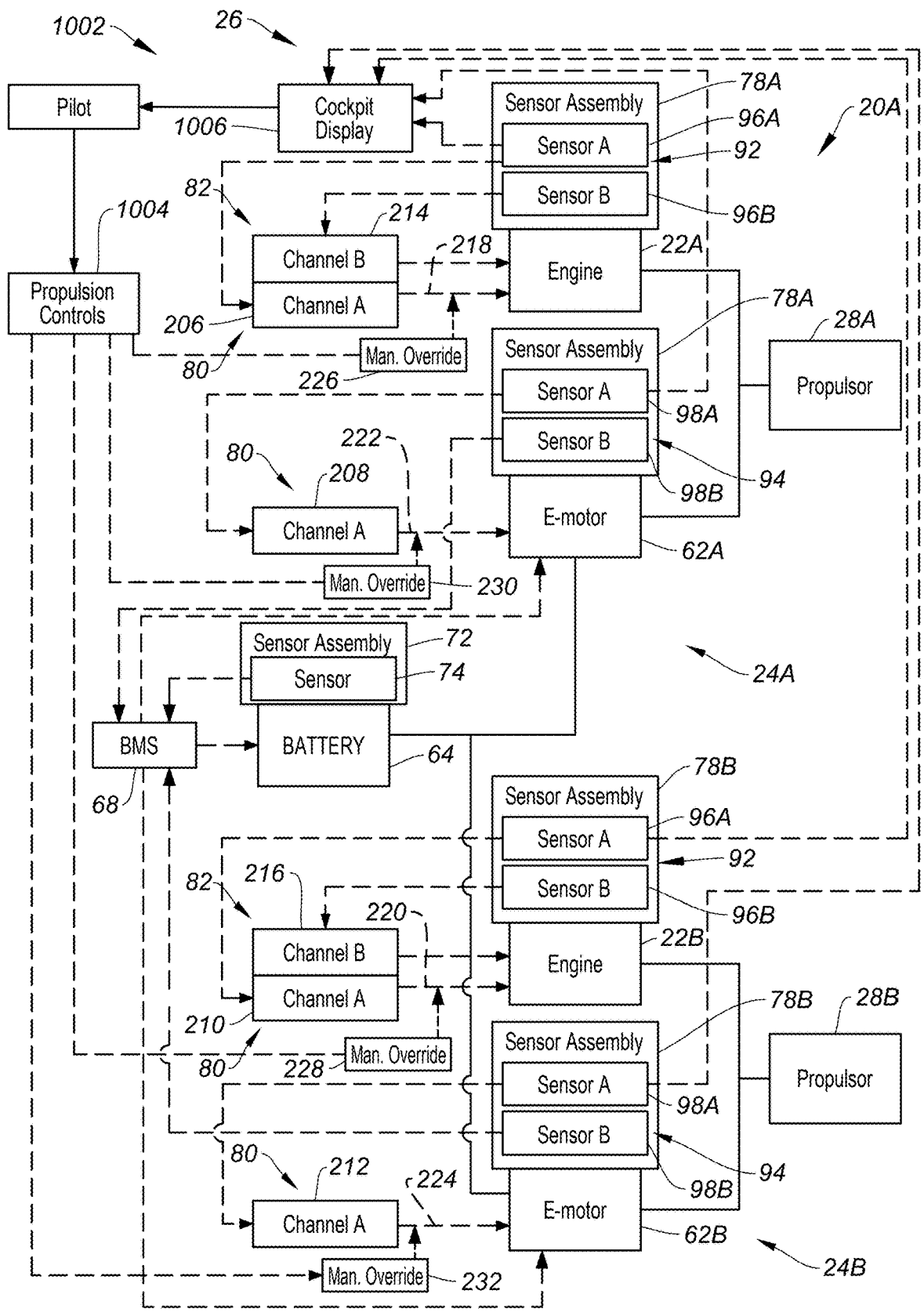
FIG. 9 schematically illustrates another aircraft propulsion system control assembly, in accordance with one or more embodiments of the present disclosure.

FIG. 9 schematically illustrates another embodiment of the electrical assembly 24 and the control assembly 26 for an aircraft (e.g., the aircraft 1000 of FIG. 1) including two propulsion systems 20—the first propulsion system 20A and the second propulsion system 20B. The first propulsion system 20A includes the first engine 22A and the first electric motor 62A coupled with the first propulsor 28A. The second propulsion system 20B includes the second engine 22B and the second electric motor 62B coupled with the second propulsor 28B. The first propulsion system 20A includes the first electrical assembly 24A and the second propulsion system 20B includes the second electrical assembly 24B. The first electrical assembly 24A and the second electrical assembly 24B may are electrically interconnected. The first electrical assembly 24A and the second electrical assembly 24B collectively include the battery 64 and the battery management system 68 (e.g., a single battery and a single battery management system). The channel A control units 80 of FIG. 9 include a first engine control unit 206 for the first engine 22A, a first electric motor control unit 208 for the first electric motor 62A, a second engine control unit 210 for the second engine 22B, and a second electric motor control unit 212 for the second electric motor 62B. The engine control units 206, 210 are respectively configured to control operation of the engines 22A, 22B by controlling a power output of the engines 22A, 22B to the propulsors 28A, 28B, for example, as discussed above. Each of the engine control units 206, 210 is configured to respectively control operation of the engines 22A, 22B by controlling a power output of the engines 22A, 22B to the propulsors 28A, 28B using measured operating parameters of engines 22A, 22B from the channel A sensors 96A of the first propulsion train sensor assembly 78A and the second propulsion train sensor assembly 78B. Each of the electric motor control units 208, 212 is configured to respectively control operation of the electric motors 62A, 62B by controlling a power output of the electric motors 62A, 62B to the propulsors 28A, 28B using measured operating parameters of electric motors 62A, 62B from the channel A sensors 98A of the first propulsion train sensor assembly 78A and the second propulsion train sensor assembly 78B.

The channel B control units 82 of FIG. 9 include a first channel B control unit 214 and a second channel B control unit 216. The first channel B control unit 214 is configured to monitor performance of the first engine control unit 206 for controlling operation of the first engine 22A. For example, the first channel B control unit 214 may be configured to directly process measurement signals from the channel B sensors 96B of the engine sensor subassembly 92 for the first propulsion train sensor assembly 78A to evaluate the first engine control unit 206 control signals 218 in response the measured operating parameters of the first engine 22A from the channel A sensors 96A of the engine sensor subassembly 92 for the first propulsion train sensor assembly 78A. The second channel B control unit 216 is configured to monitor performance of the second engine control unit 210 for controlling operation of the second engine 22B. For example, the second channel B control unit 216 may be configured to directly process measurement signals from the channel B sensors 96B of the engine sensor subassembly 92 for the second propulsion train sensor assembly 78B to evaluate the second engine control unit 210 control signals 220 in response the measured operating parameters of the second engine 22B from the channel A sensors 96A of the engine sensor subassembly 92 for the second propulsion train sensor assembly 78B. The battery management system 68 is configured to monitor performance of the first electric motor control unit 208 and the second electric motor control unit 212 for controlling operation of the first electric motor 62A and the second electric motor 62B, respectively. The battery management system 68 is configured to directly process measurement signals from the channel B sensors 98B of the electric motor sensor subassembly 94 for the first propulsion train sensor assembly 78A to evaluate the first electric motor control unit 208 control signals 222 in response the measured operating parameters of the first electric motor 62A from the channel A sensors 98A of the engine sensor subassembly 92 for the first propulsion train sensor assembly 78A. The battery management system 68 is configured to monitor performance of the second electric motor control unit 212 for controlling operation of the second electric motor 62B. The battery management system 68 is configured to directly process measurement signals from the channel B sensors 98B of the electric motor sensor subassembly 94 for the second propulsion train sensor assembly 78B to evaluate the second electric motor control unit 212 control signals 224 in response the measured operating parameters of the second electric motor 62B from the channel A sensors 98A of the engine sensor subassembly 92 for the second propulsion train sensor assembly 78B. The cockpit control system 1002 of FIG. 9 may additionally include a first engine manual override 226 and a second engine manual override 2280. The first engine manual override 226 and the second engine manual override 228 may facilitate manual control of the first engine 22A and the second engine 22B, respectively, by the propulsion controls 1004, for example, in response to a failure or other degradation of the first engine control unit 206 and/or the second engine control unit 210. Similarly, the cockpit control system 1002 of FIG. 9 may additionally include a first electric motor manual override 230 and a second electric motor manual override 232. The first electric motor manual override 230 and the second electric motor manual override 232 may facilitate manual control of the first electric motor 62A and the second electric motor 62B, respectively, by the propulsion controls 1004.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises"

means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected, or the like may include permanent, removable, temporary, partial, full and/or any other possible attachment option.

The terms "substantially," "about," "approximately," and other similar terms of approximation used throughout this patent application are intended to encompass variations or ranges that are reasonable and customary in the relevant field. These terms should be construed as allowing for variations that do not alter the basic essence or functionality of the invention. Such variations may include, but are not limited to, variations due to manufacturing tolerances, materials used, or inherent characteristics of the elements described in the claims, and should be understood as falling within the scope of the claims unless explicitly stated otherwise.

No element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

The invention claimed is:

1. An aircraft propulsion system assembly comprising:
a first aircraft propulsion system including a first propulsor, a first engine, and a first electrical assembly,
the first engine includes a first rotational assembly configured for rotation about a first engine rotational axis of the first engine, and the first rotational assembly is coupled to the first propulsor, and
the first electrical assembly includes a first electric motor, a first battery, and a first battery management system, the first electric motor includes a first rotor, the first rotor is coupled to the first propulsor, the first battery is electrically connected to the first electric motor;
a control assembly including a first propulsion train sensor assembly for the first aircraft propulsion system, a plurality of channel A control units, and at least one channel B control unit, the first propulsion train sensor assembly includes a first engine sensor subassembly and a first electric motor sensor subassembly, the first engine sensor subassembly is configured to measure one or both of a first engine rotation speed and a first engine torque of the first rotational assembly, the first electric motor sensor subassembly is configured to measure one or both of a first electric motor rotation speed and a first electric motor torque of the rotor, the plurality of channel A control units includes a first engine control unit for the first engine and a first electric motor control unit for the first electric motor, the at least one channel B control unit is connected in signal communication with the first engine sensor subassembly and the first engine control unit, and the at least one channel B control unit includes a first processor connected in signal communication with a first non-transitory memory including instructions which, when executed by the first processor, cause the first processor to:
identify valid and invalid output control signals of the first engine control unit using the one or both of the first engine rotation speed and the first engine torque; and
the first battery management system is connected in signal communication with the first electric motor sensor subassembly and the first electric motor control unit, and the first battery management system includes a second processor connected in signal communication with a second non-transitory memory including instructions which, when executed by the second processor, cause the second processor to:
identify valid and invalid output control signals of the first electric motor control unit using the one or both of the first electric motor rotation speed and the first electric motor torque.

2. The aircraft propulsion system assembly of claim 1, wherein the first aircraft propulsion system further includes a gear box, and the gear box couples the first rotational assembly and the first rotor to the first propulsor.

3. The aircraft propulsion system assembly of claim 1, wherein the at least one channel B control unit is a single channel B control unit.

4. The aircraft propulsion system assembly of claim 3, wherein the first engine control unit and the first electric motor control unit are connected in signal communication with the first propulsion train sensor assembly.

5. The aircraft propulsion system assembly of claim 1, further comprising a second aircraft propulsion system including a second propulsor, a second engine, and a second electrical assembly,
the second engine includes a second rotational assembly configured for rotation about a second engine rotational axis of the second engine, and the second rotational assembly is coupled to the second propulsor, and the second electrical assembly includes a second electric motor, the second electric motor includes a second rotor, and the second rotor is coupled to the second propulsor;

wherein the control assembly further includes a second propulsion train sensor assembly for the second aircraft propulsion system, the second propulsion train sensor assembly includes a second engine sensor subassembly and a second electric motor sensor subassembly, the second engine sensor subassembly is configured to measure one or both of a second engine rotation speed and a second engine torque of the second rotational assembly, the second electric motor sensor subassembly is configured to measure a second electric motor rotation speed and a second electric motor torque of the rotor, the plurality of channel A control units includes a second engine control unit for the second engine and a second electric motor control unit for the second electric motor, the at least one channel B control unit is connected in signal communication with the second engine sensor subassembly and the second engine control unit, and the at least one channel B control unit includes a third processor connected in signal communication with a third non-transitory memory including instructions which, when executed by the third processor, cause the third processor to:

identify valid and invalid output control signals of the second engine control unit using the one or both of the second engine rotation speed and the second engine torque.

6. The aircraft propulsion system assembly of claim 5, wherein the first battery management system is connected in signal communication with the second electric motor sensor subassembly and the second electric motor control unit, and the instructions, when executed by the second processor, further cause the second processor to:

identify valid and invalid output control signals of the second electric motor control unit using the one or both of the second electric motor rotation speed and the second electric motor torque.

7. The aircraft propulsion system assembly of claim 5, wherein the second electrical assembly includes a second battery and a second battery management system, the second battery is electrically connected to the second electric motor, the second battery management system is connected in signal communication with the second electric motor sensor subassembly and the second electric motor control unit, and the second battery management system includes a fourth processor connected in signal communication with a fourth non-transitory memory including instructions which, when executed by the fourth processor, cause the fourth processor to:

identify valid and invalid output control signals of the second electric motor control unit using the one or both of the second electric motor rotation speed and the second electric motor torque.

8. The aircraft propulsion system assembly of claim 5, wherein the at least one channel B control unit includes a first channel B control unit and a second channel B control unit, the first channel B control unit is connected in signal communication with the first engine control unit and the second channel B control unit is connected in signal communication with the second engine control unit.

9. The aircraft propulsion system assembly of claim 5, wherein the first engine control unit and the first electric motor control unit are connected in signal communication with the first propulsion train sensor assembly and the second engine control unit and the second electric motor control unit are connected in signal communication with the second propulsion train sensor assembly.

10. The aircraft propulsion system assembly of claim 5, wherein the first electrical assembly and the second electrical assembly are electrically interconnected.

11. An aircraft propulsion system assembly comprising:
a cockpit control system;
an aircraft propulsion system including a propulsor, an engine, and an electrical assembly,
the engine includes a rotational assembly configured for rotation about an engine rotational axis of the engine, and the rotational assembly is coupled to the propulsor, and
the electrical assembly includes an electric motor, a battery, and a battery management system, the electric motor includes a rotor, and the rotor is coupled to the propulsor;
a control assembly including a propulsion train sensor assembly, a plurality of channel A control units, and at least one channel B control unit,
the propulsion train sensor assembly includes an engine sensor subassembly and an electric motor sensor subassembly, the engine sensor subassembly is configured to measure one or both of an engine rotation speed and an engine torque of the rotational assembly, the electric motor sensor subassembly is configured to measure one or both of an electric motor rotation speed and an electric motor torque of the rotor;
the plurality of channel A control units includes an engine control unit for the engine and an electric motor control unit for the electric motor, the engine control unit is configured to generate an output engine control signal for operation of the engine based on an input engine command signal from the cockpit control system, and the electric motor control unit is configured to generate an output electric motor control signal for operation of the electric motor based on an input electric motor command signal from the cockpit control system, and
the at least one channel B control unit includes a first processor connected in signal communication with a first non-transitory memory including instructions which, when executed by the first processor, cause the first processor to:
identify whether the output engine control signal is valid or invalid using the one or both of the engine rotation speed and the engine torque; and
the battery management system is connected in signal communication with the electric motor sensor subassembly and the electric motor control unit, and the battery management system includes a second processor connected in signal communication with a second non-transitory memory including instructions which, when executed by the second processor, cause the second processor to:
identify whether the output electric motor control signal is valid or invalid using the one or both of the electric motor rotation speed and the electric motor torque.

12. The aircraft propulsion system assembly of claim 11, wherein the engine sensor subassembly includes at least one channel A sensor and at least one channel B sensor, each of the at least one channel A sensor and the at least one channel B sensor is configured to measure the one or both of the engine rotation speed and the engine torque, the at least one channel A sensor is connected in signal communication with the cockpit control system, and the at least one channel B sensor is connected in signal communication with the at least one channel B control unit.

13. The aircraft propulsion system assembly of claim 12, wherein the instructions, when executed by the first processor, further cause the first processor to identify the valid and invalid output control signals of the output engine control signal using the one or both of the engine rotation speed and the engine torque measured by the at least one channel B sensor.

14. The aircraft propulsion system assembly of claim 11, wherein the electric motor sensor subassembly includes at least one channel A sensor and at least one channel B sensor, each of the at least one channel A sensor and the at least one channel B sensor is configured to measure the one or both of the electric motor rotation speed and the electric motor torque, the at least one channel A sensor is connected in signal communication with the cockpit control system, and the at least one channel B sensor is connected in signal communication with the battery management system.

15. The aircraft propulsion system assembly of claim 14, wherein the instructions, when executed by the second processor, further cause the second processor to identify the valid and invalid output control signals of the output electric motor control signal using the one or both of the electric motor rotation speed and the electric motor torque measured by the at least one channel B sensor.

16. An aircraft propulsion system assembly comprising:
a cockpit control system;
an aircraft propulsion system including a propulsor, an engine, and an electrical assembly,
the engine includes a rotational assembly configured for rotation about an engine rotational axis of the engine, and the rotational assembly is coupled to the propulsor, and
the electrical assembly includes an electric motor, a battery, and a battery management system, the electric motor includes a rotor, the rotor is coupled to the propulsor, and the battery is electrically connected to the electric motor; and
a control assembly including a propulsion train sensor assembly, a plurality of channel A control units, and at least one channel B control unit,
the propulsion train sensor assembly includes a plurality of sensors configured to measure one or both of an engine rotation speed and an engine torque of the engine and one or both of an electric motor rotation speed and an electric motor torque of the electric motor, and the propulsion train sensor assembly is connected in signal communication with the cockpit control system, the plurality of channel A control units, the at least one channel B control unit, and the battery management system;
the plurality of channel A control units includes an engine control unit for the engine and an electric motor control unit for the electric motor, the engine control unit is configured to generate an output engine control signal for operation of the engine based on the one or both of the engine rotation speed and the engine torque, and the electric motor control unit is configured to generate an output electric motor control signal for operation of the electric motor based on one or both of the electric motor rotation speed and the electric motor torque, and
the at least one channel B control unit includes a first processor connected in signal communication with a first non-transitory memory including instructions which, when executed by the first processor, cause the first processor to:
identify whether the output engine control signal is valid or invalid using the one or both of the engine rotation speed and the engine torque; and
the battery management system includes a second processor connected in signal communication with a second non-transitory memory including instructions which, when executed by the second processor, cause the second processor to:
identify whether the output electric motor control signal is valid or invalid using the one or both of the electric motor rotation speed and the electric motor torque.

17. The aircraft propulsion system assembly of claim 16, wherein the cockpit control system includes a manual override for the output engine control signal.

18. The aircraft propulsion system assembly of claim 16, wherein the cockpit control system includes a manual override for the output electric motor control signal.

19. The aircraft propulsion system assembly of claim 16, wherein the aircraft propulsion system further includes a gear box, and the gear box couples the rotational assembly and the rotor to the propulsor.

20. The aircraft propulsion system assembly of claim 16, wherein the at least one channel B control unit includes a single channel B control unit, and the single channel B control unit is connected in signal communication with the engine control unit.

* * * * *